June 7, 1927.
S. B. WINN
1,631,847
TRACTOR TRAILER COUPLER
Filed Aug. 5, 1925
5 Sheets-Sheet 1
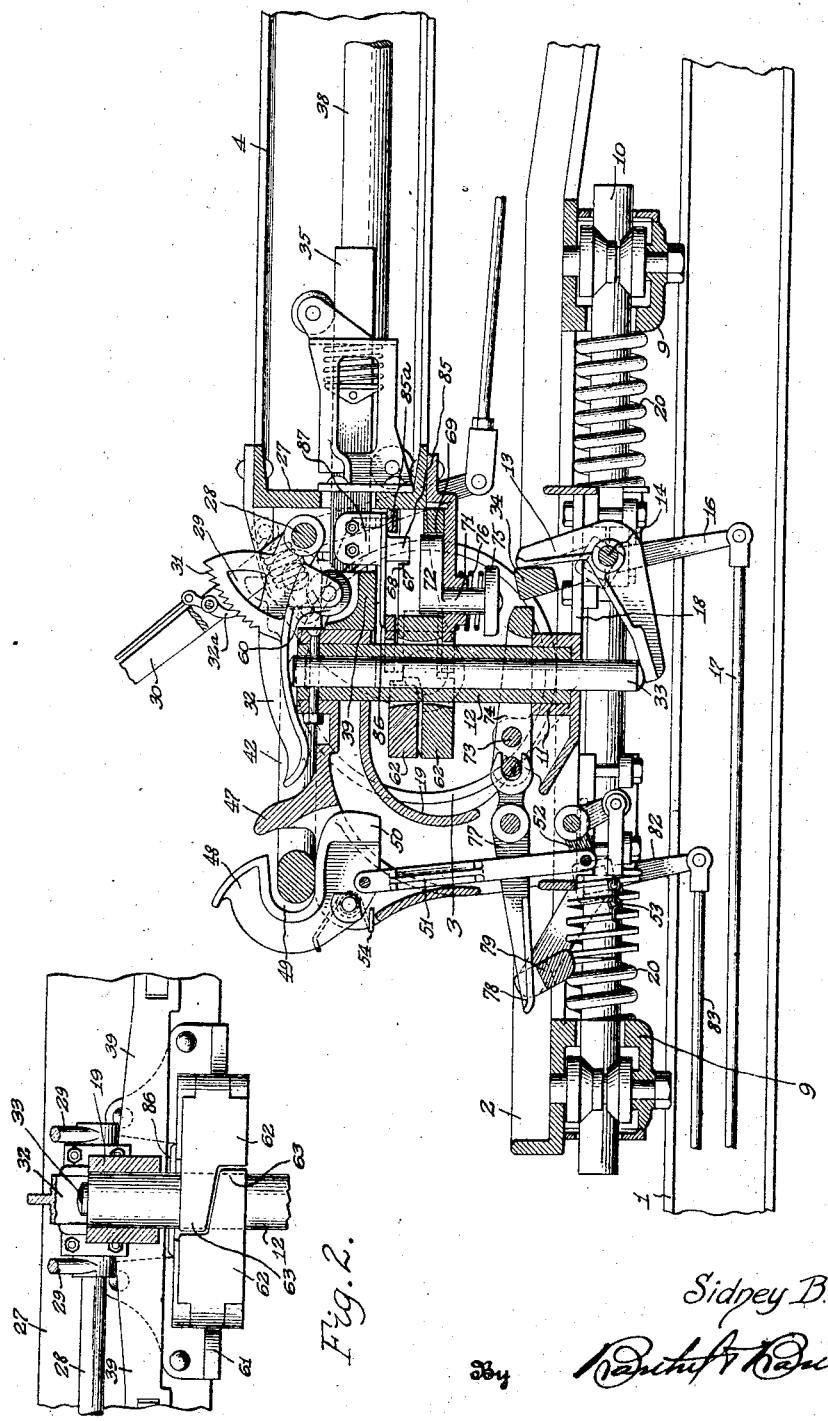

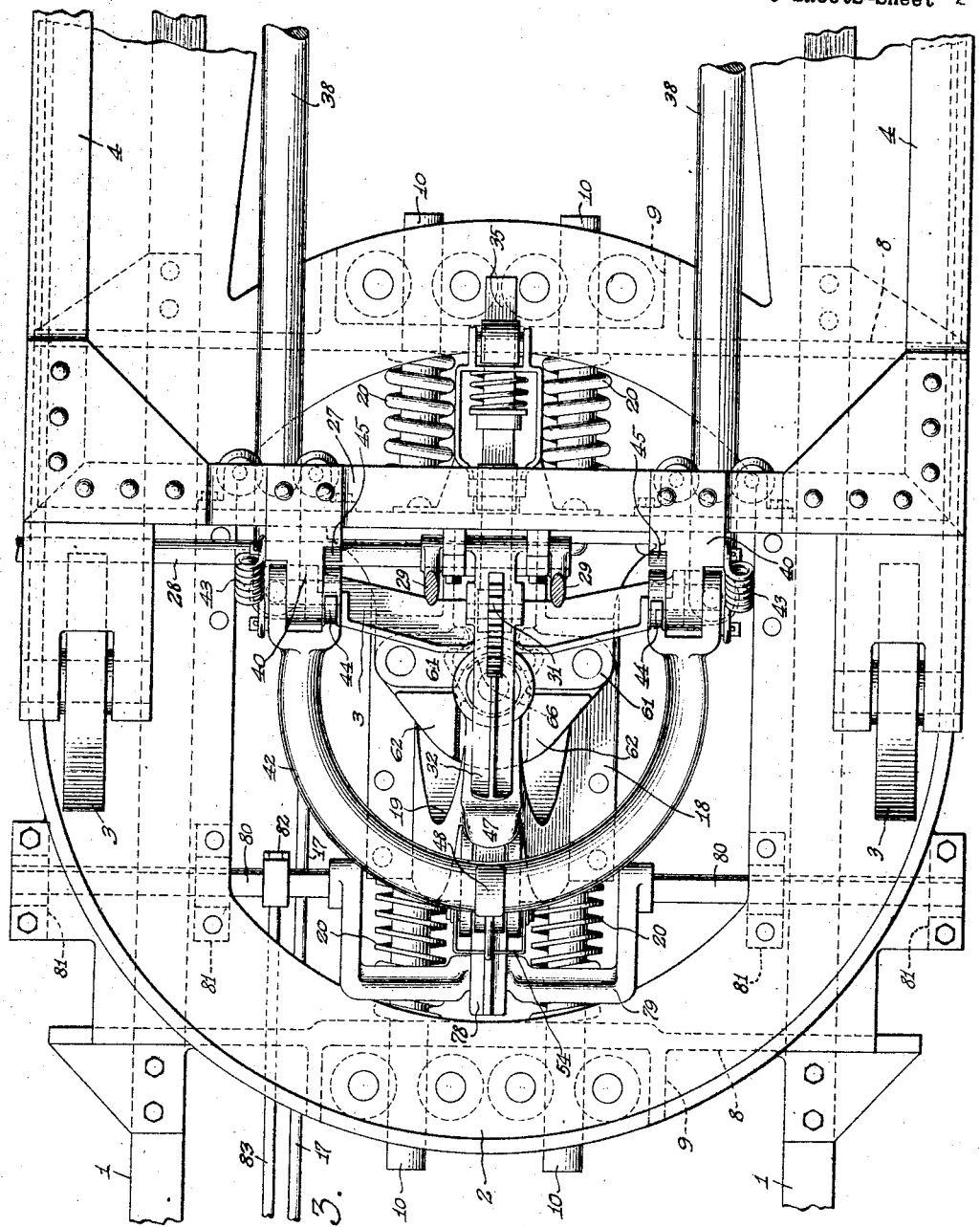

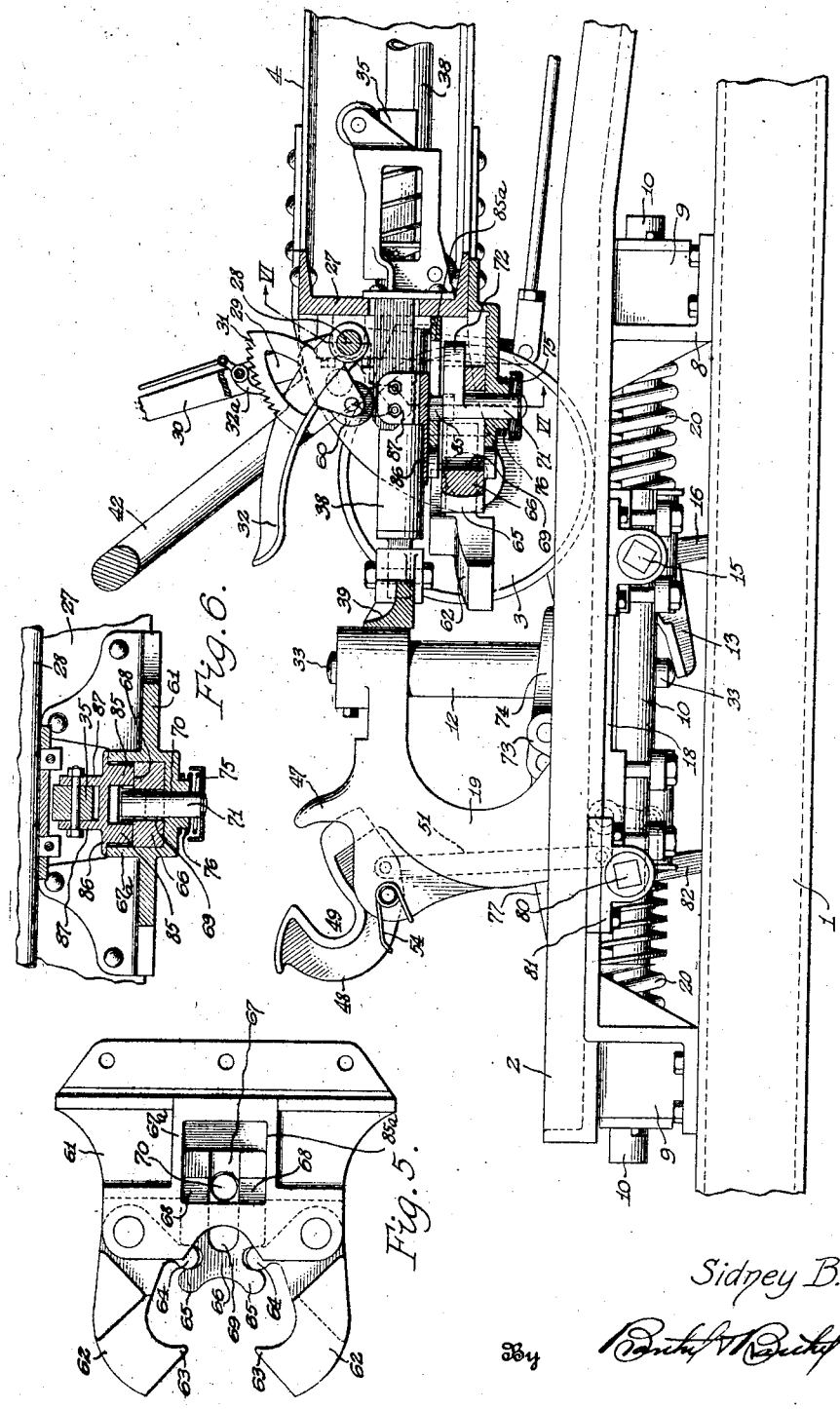

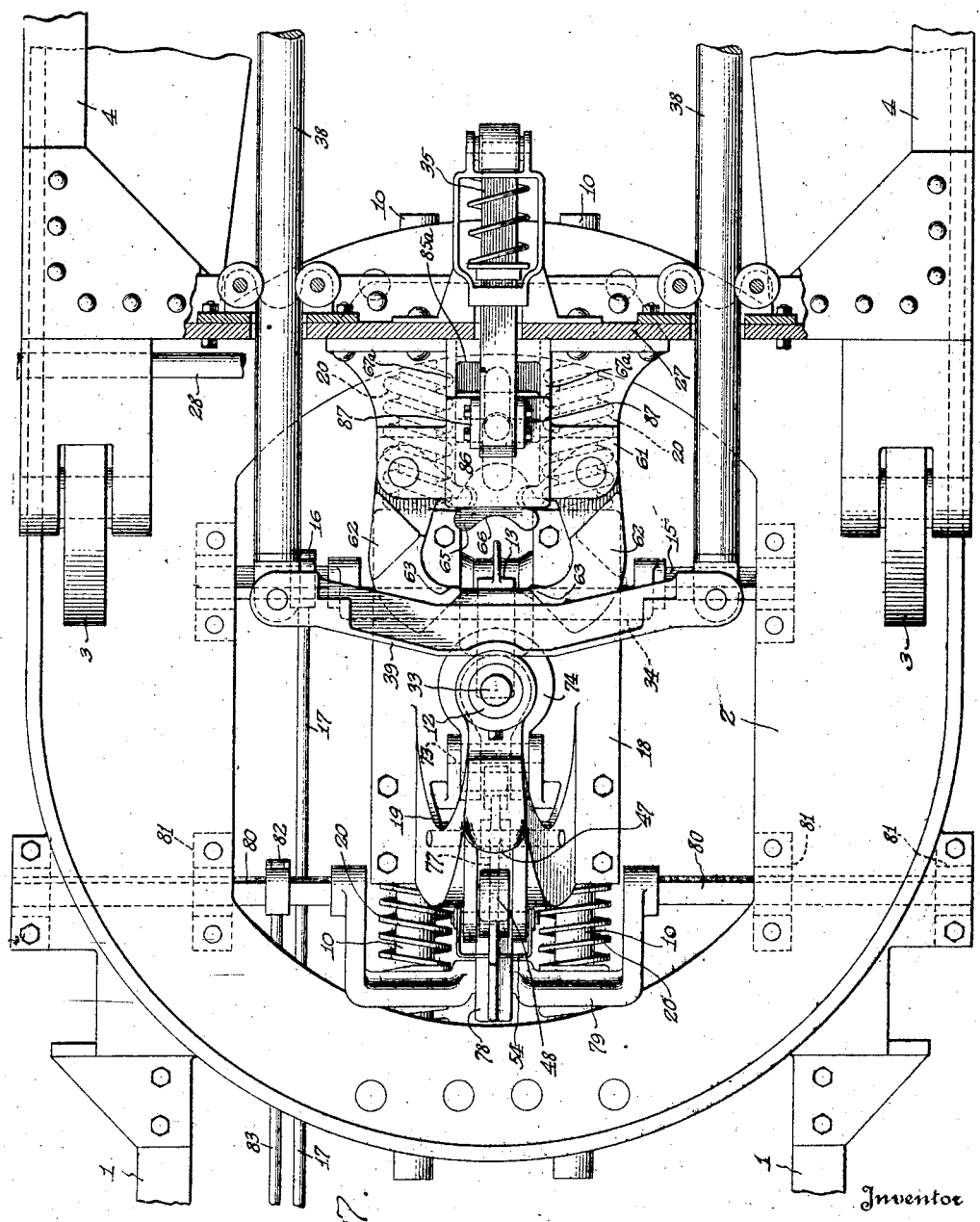

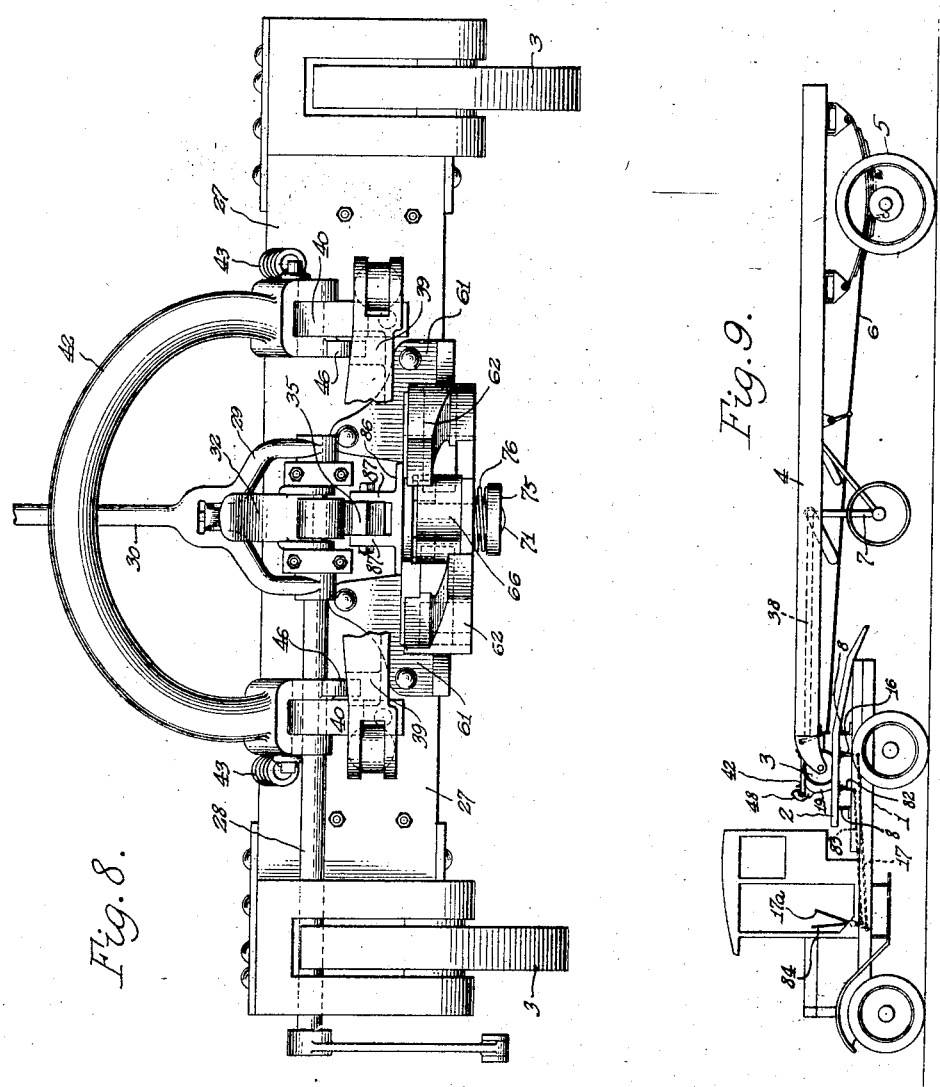

Patented June 7, 1927.

1,631,847

UNITED STATES PATENT OFFICE.

SIDNEY B. WINN, OF LAPEER, MICHIGAN.

TRACTOR TRAILER COUPLER.

Application filed August 5, 1925. Serial No. 48,201.

This invention relates to tractor trailer coupling and my invention aims to furnish a tractor with a coupling member and a trailer with coupling members or jaws adapted to embrace the tractor coupling member and establish an operative coupled relation between the tractor and trailer.

The coupling device has been especially designed for a tractor trailer combination wherein the trailer has a shiftable support normally maintained in a raised inactive position by a coupled relation of the tractor and trailer and adapted to descend by gravity, when the tractor is uncoupled from the trailer, to assume a lowered active position and support the forward end of the trailer so that the trailer may be used independent of the tractor. The trailer is equipped with a brake mechanism adapted to be controlled from the tractor and also operatable when the trailer is independent of the tractor. The brake mechanism is further characterized by being operatable to apply the brakes of the trailer when said trailer crowds the tractor.

The tractor equipment includes, among other things, a draft appliance supporting the tractor coupling member; a safety coupling device, and brake operating mechanism for a manual and automatic control of the trailer brakes.

My coupling device as applied to such a tractor trailer combination includes, in addition to the tractor and trailer coupling members aforesaid mentioned, jaw holding means by which the trailer jaws are held in positive engagement with the tractor member; a release pin for locking the jaw holder; a release pin for locking the jaw holding means, tractor means by which the release pin may be actuated, and means on the trailer for lending impetus to a lowering movement of the trailer support. While the trailer support is adapted to descend by gravity, yet there may be times when the movement of said support is sluggish due to something or other sticking and failing to immediately respond. Therefore the last mentioned means has been employed for insuring a positive and reliable movement of the trailer support during disengagement of the tractor from the trailer.

My coupling device will be hereinafter described and then claimed and reference will now be had to the drawings, wherein—

Figure 1 is a longitudinal sectional view of the tractor trailer coupler showing a rear end portion of a tractor coupled to the forward end portion of a trailer;

Fig. 2 is an end view of the coupler jaws in a closed position;

Fig. 3 is a plan of the coupling device as shown in Fig. 1;

Fig. 4 is a view similar to Fig. 1, showing the coupling members separated and in positions assumed either by engagement or disengagement of the tractor relative to the trailer;

Fig. 5 is a plan of the trailer coupling members or jaws in an open position;

Fig. 6 is a cross sectional view taken on the line VI—VI of Fig. 4;

Fig. 7 is a plan of the coupler in a position shown in Fig. 4;

Fig. 8 is a view of the forward end of the trailer showing the coupling members or jaws in an open position, and Fig. 9 is a diagrammatic elevation of the tractor trailer combination embodying features of this invention.

In order that the relation of the principal parts of the tractor trailer combination may be understood, I have shown in Fig. 9 a tractor 1 having a fifth wheel table 2 and resting on this table are rollers or wheels 3 at the forward end of a trailer 4. The trailer 4 has the usual rear end truck 5 provided with a brake mechanism 6 which may be controlled from the tractor 1; automatically actuated when the trailer crowds the tractor; operated by hand when the trailer is detached from the tractor; and automatically controlled incident to coupling or uncoupling of the tractor and trailer. The trailer has a shiftable leg or support 7 and extending forwardly from said support are support shifting members 38 normally protruding from the forward end of the trailer and connected by a cross head 39.

The fifth wheel table 2 is supported from the chassis or side frames of the tractor 1 by transverse beams 8 and intermediate the ends of said beams are housings 9. In each housing are a series of anti-frictional rollers, arranged in sets with the rollers of one housing in longitudinal alinement with the rollers of the other housing so that said rollers may cooperate in supporting draft rods 10.

Mounted on the draft rods 10 intermediate the ends thereof, is the base 18 of a hollow tractor member 19 and encircling the draft rods 10, between the housings 9 and the ends of the base 18, are two sets of springs 20 which afford a yieldable connection between the tractor and trailer, as will hereinafter appear, the springs absorbing strains incident to pulling, stopping, starting and irregular road conditions.

The tractor member 19 forms part of a main coupling mechanism and a safety coupling mechanism. The base 18 has a socket 11 for a tubular coupling pin 12 which has its upper end fixed in the upper end of the tractor member 19. The pin 12 constitutes part of the main coupling mechanism of the tractor and trailer. The tractor member 19 has a horn 47 which cooperates with a pivoted spring pressed latch 48 in forming a socket or keeper 49 for a pivoted spring elevated yoke shaped safety coupling member 42, said member having forked ends pivotally supported by brackets 40 attached to the forward transverse frame 27 of the trailer. The forked ends of the coupling member 42 are connected by coiled retractile springs 43 to the brackets 40 with said springs arranged to swing the coupling member upwardly and hold it at an angle to the horizontal; the open or raised position of the coupling member being defined by stop lugs 44 of the coupling member engaging stop shoulders 45 of the brackets 40. This is best shown in Figs. 3 and 8, also lugs 46 carried by the ends of the coupling member 42 and adapted to be engaged by the cross head 39 to lower the coupling member 42 to a closed or coupled position as the tractor becomes attached to the trailer by the main coupling mechanism, hereinafter referred to.

The latch 48 is of such configuration that the coupling member 42 may impinge against the latch and snap into a socket 49, said latch including a jaw 50 that may be engaged by the coupling member 42 to assist in closing the latch. Connected to the jaw 50 of the latch is a latch operating mechanism including a link 51 arranged in a hollow tractor member 19 and operatively connected to a bell crank 52 in the lower part of base 18 of the tractor member 19. Attached to the bell crank 52 is a flexible connection 53 extending forwardly so that the driver of the tractor may manually open the latch 48 against the action of a spring 54 associated with said latch.

The brake operating mechanism 6 of the trailer 4 includes a transverse rock shaft 28 journaled in bearings carried by the end frame 27 and on the rock shaft is mounted the forked end 29 of a hand lever 30 by which the trailer brakes may be actuated when the trailer is detached from the tractor. Loosely mounted on the rock shaft 28 is a sector rack 31 and an operative relation between this rack and hand lever may be established by a hand controlled pawl 32ᵃ carried by the lever 30. The sector rack 31 has a shoe 32 adapted to be engaged by the upper end of the tractor member 19, and this shoe 32 is adapted to be engaged by a brake actuating pin 33 slidable in the tubular coupling member 12 of the tractor with the lower end of said pin engaged by a brake operating mechanism carried by the tractor. The brake operating mechanism includes a bell crank 13 on a rock shaft 14 supported from the base 18 of the tractor member 19 with one end of the bell crank engaging the lower end of the brake pin 33 and the opposite end of the crank engaging a crank portion 34 of a rock shaft 15 supported from the table 2. The rock shaft 15 has a crank 16 connected by a brake rod 17 to a brake lever 17ᵃ carried by the tractor 1, so that the driver of the tractor may set the trailer brakes at will. It is also by virtue of this mechanism that the trailer brakes are brought into action by the trailer attempting to crowd or push the tractor, and it is by virtue of the lever 30 that the trailer brakes may be manually controlled when the trailer is independent of the tractor.

The brake mechanism between the tractor and trailer also includes a spring distended member 35 suitably supported between antifrictional rollers from the end frame 27 of the trailer and this spring distended member normally engages the cross head 39 and serves as a pusher to lend impetus to forward movement of the cross head should the support 7 be at all sluggish in its gravitational movement. The member 35 also serves to engage a roller 60 of the sector rack 31 and holds said rack and the lever 30 raised with the trailer brake set, this occurring as the support 7 starts to descend by gravity and assume an active position.

Centrally of the transverse member 27 is a bracket 61 and pivotally supported by said bracket is a set of laterally swingable coupling members or jaws 62 having overlapping bills 63 adapted to embrace the tractor coupling member or pin 12 and establish a coupled relation between the tractor and trailer. The inner ends of the jaws 62 are provided with tongues 64 extending into the head 65 of a slidable member 66 arranged in a housing 67ᵃ forming part of the bracket 61. The slidable member 66 constitutes holding means for said jaws either open or closed and the inner end of the slidable member 66 has a longitudinal slot 67, top notches 68 and a pocket 69 which forms part of the slot 67. The bottom of the housing 67ᵃ is provided with an opening 70 for a release pin 71 which has its upper end provided with a head 72 conforming in shape to the pocket 69, so that when within said pocket the member 66 cannot slide. The release pin 71 is adapted to be raised to place its head 72 in the slot 67 and thereby permit of the member 66 moving outwardly. This raised position of the release pin 71 and an extended position of the slidable member 66 are best shown in Fig. 4, and the tractor mechanism for raising the release pin will now be considered in connection with Figs. 1 and 4.

The base 18 of the tractor member 19 has a bearing 73 for a yoke 74 straddling the tractor coupling member or pin 12 and extending under a head 75 on the lower end of the release pin 71. The head 75 is cup-shaped to support a coiled expansion spring 76 which holds the release pin 71 normally lowered with its head 72 in the pocket 69 of the slidable member 66.

The pivoted yoke 74 is operatively engaged by a lever 77 pivotally mounted in the hollow tractor member 19 and said lever has a shoe 78 bearing on the crank portion 79 of a rock shaft 80, journaled in bearings 81 carried by the table 2. Connected to a crank 82 of the rock shaft 80 is a coupling rod 83 extending forwardly to a coupler lever 84 in the cab of the tractor 1.

By shifting the lever 84 the shaft 80 may be rocked and the lever 77 and the yoke 74 actuated to raise the release pin 71 and permit of outward movement of the slidable member 66. The engagement between the lever shoe 78 and the crank portion 79 of the rock shaft 80 is such that the draft appliance may function without interfering with the coupler actuating mechanism of the tractor.

The top of the housing 67ª has a large opening 85ª providing clearance for depending lugs 85 which extend into the notches 68 of the slidable member 66. The lugs 85 are carried by a plate 86 slidable on top of the housing 67ª and said plate is connected by side ears 87 to the sides of the spring distended member 35, so that this spring distended member may be pulled forwardly by the slidable member 66, when said slidable member is released by the pin 71.

For considering the operation of the coupling mechanism reference will now be had to Fig. 4, and it will be assumed that the tractor is backing its rear end under the forward end of the trailer to become coupled thereto. The trailer has been left with its support 7 on the ground; the cross head 39 distended relative to the transverse member 27; the spring pressed member 35 distended; the trailer brakes set by reason of the sector rack 31 having been tilted and held by the member 35, and the jaws 62 open because the slidable member 66 has been moved outwardly by the jaws 62. The lugs 85 extending into the slidable member insures movement of the member 35 beneath the rollers 60 to hold the trailer brakes set. Such is the condition of the trailer as the rear end of the tractor backs thereunder to elevate the forward end of the trailer and place its wheels 3 on the fifth wheel table 2 of the tractor. As this is accomplished the upper end of the tractor member 19 impinges against the cross head 39 and said cross head is pushed rearwardly with the members 38 to elevate the support 7 and place it in an active position. As the cross head 39 is carried rearwardly it eventually impinges against the forward end of the member 35 and approximately at the same time the tractor coupling member or pin 12 engages the head 65 of the slidable member 66 and pushes it rearwardly. By this time the tractor coupling member or pin 12 is clearly between the jaws 62 and as the slidable member 66 is pushed rearwardly the pocket 69 is brought into registration with the head 72 of the release pin 71, so that the expansive force of the spring 76 may cause the pin 71 to lower and place the head 72 thereof in the pocket 69. This locks the slidable member 66 in its innermost position with the jaws 62 closed about the coupling member or pin 12 of the tractor, thus establishing a coupled relation between the tractor and trailer.

As the slidable member 66 is pushed rearwardly it carries with it the lugs 85 so that the member 35 is retracted, but this retraction of the member 35 is preferably accomplished by the cross head 39 impinging against the outer end of the member 35. As the member 35 is retracted the roller 60 of the sector rack 31 rides off of the member 35 into the cross head 39, thereby releasing the trailer brakes, so that the trailer may be easily moved, by the tractor. Such release of the trailer brakes places the shoe 32 of the sector rack in operative relation to the upper end of the brake pin 33, so that the trailer brakes may be controlled by the brake lever 17ª of the tractor.

It has been pointed out that the safety auxiliary coupling is also automatically actuated when the cross head 39 engages the lugs 46 to swing the coupling member 42 to closed position in engagement with the tractor member 19.

Just considering the operation of the coupling mechanism when the tractor is withdrawn from the trailer, elevation of the release pin 71 by the manually actuated yoke 74 shifts the head 72 of the pin 71 into the slot 67 so that the slidable member 66 may move outwardly. This outward movement is accomplished by the withdrawing movement of the tractor coupling member or pin 12 which opens the jaws 62. The spring distended member 35 is permitted to move by reason of the cross head 39 having followed the tractor member 19 under the influence of the gravity descending support 7 of the trailer which is of sufficient weight to push the cross head 39 forwardly.

This invention has been particularly directed to the coupling mechanism of the tractor and trailer combination and it is thought that the operation and utility of other features of my tractor trailer combination will be apparent when considering the patents resulting from such applications as Serial Numbers 374,889, filed April 19, 1920; 384,947, renewed Nov. 22, 1924; 611,319, filed Jan. 8, 1923; 602,929, filed Nov. 24, 1922, and 754,570, filed Dec. 8, 1924, these patents being No. 1,548,965 granted Aug. 11, 1925 (280—33.1); No. 1,548,966, granted Aug. 11, 1925 (filed originally May 28, 1920, and renewed Nov. 22, 1924); No. 1,548,967, granted Aug. 11, 1925 (280—33.1); No. 1,548,968 granted Aug. 11, 1925, granted on the applications respectively, above.

What I claim is:—

1. In a tractor trailer combination wherein a tractor is adapted to have its rear end backed under the forward end of a trailer and coupled thereto, and wherein the tractor includes a coupling pin:—means on the forward end of the trailer for engagement with the tractor pin to operatively couple the tractor and trailer, said means comprising a set of jaws adapted to be opened and closed relative to said tractor pin, said jaws being supported from said trailer to be opened and closed by disengagement and engagement of said tractor relative to said trailer, jaw holding means supported from said trailer adapted to hold said jaws closed about the tractor pin, and means operatable from said tractor adapted to release said jaw holding means and permit of said jaws being opened.

2. A tractor trailer combination as claimed in claim 1, further characterized by said trailer having a front end support adapted to be raised by said tractor pin and lowered by gravity, and means adapted to simultaneously lend impetus to a lowering movement of said support and an opening movement of said jaws.

3. A tractor trailer combination as called for in claim 1, wherein said jaw holding means includes a slidable member constantly engaging said jaws.

4. A tractor trailer combination as called for in claim 1, wherein the last mentioned means includes a release pin normally in said jaw holding means and adapted to be raised to release said jaw holding means.

5. A tractor trailer coupling comprising a tractor pin, a trailer bracket, jaws on said bracket adapted to engage said pin, a slidable member on said bracket connecting said jaws and adapted to be actuated by said jaws, a releasable pin having its upper end normally in said slidable member to hold said member and adapted to be projected upwardly to release said slidable member for actuation by said jaws, and means carried by said tractor adapted to be positioned under said bracket to raise said releasable pin to release said slidable member for actuation by said jaws.

6. A tractor trailer coupling as called for in claim 5, wherein said releasable pin has a head, and said slidable member a pocket to receive said head when said pin is lowered, and a slot affording clearance for said pin head when raised.

7. In a tractor trailer combination wherein a tractor and trailer are engageable and disengageable at will, a coupling pin, swingable jaws adapted to engage said pin and couple said tractor and trailer, trailer brakes, and means operable from said jaws adapted to hold said trailer brakes set when said jaws are open and release said trailer brakes when said jaws are closed.

8. A tractor trailer combination as called for in claim 7, wherein said means includes a jaw actuated member between said jaws, and a brake setting member actuated thereby.

9. In a tractor trailer combination wherein a tractor and trailer are engageable and disengageable at will and the rear end of the tractor is adapted to be backed under the forward end of the trailer and coupled thereto, and wherein the tractor has a coupling pin:—means on the forward end of the trailer for engagement with the tractor pin to operatively couple the tractor and trailer, said means comprising jaws adapted to be opened by said tractor pin moving in an outwardly direction from said jaws, a slidable member articulated with said jaws and actuated thereby, a release pin normally in said slidable member for holding it with said jaws closed about said tractor pin, and means about said tractor pin adapted for operating said release pin to release said slidable member and permit said tractor pin to open said jaws.

10. In a tractor trailer combination wherein a tractor and trailer are engageable and disengageable at will and the rear end of the tractor is adapted to be backed under the forward end of the trailer and coupled thereto, and wherein the trailer has a support adapted to descend by gravity to support the forward end of the trailer when independent of the tractor:—coupling means for said tractor and trailer, said coupling means comprising a tractor member, jaws supported from said trailer, embracing said tractor member and adapted to be separated to release said tractor member, said tractor member controlling the descent of the trailer support, and means on said trailer adapted to lend impetus to the descent of said trailer support.

11. In a tractor trailer combination, a tractor, a draft appliance on said tractor, a coupling member on said draft appliance, a trailer, laterally swingable jaws supported from said trailer adapted to embrace said tractor coupling member and with said draft appliance establishing a yieldable coupled relation between said tractor and trailer, a release pin holding said jaws closed about said tractor coupling member, and means about said tractor coupling member adapted to operate said release pin and permit said tractor coupling member to open said jaws.

12. A tractor trailer combination as called for in claim 11, wherein said means is pivotally supported from said draft appliance and operatable from said tractor.

13. In a tractor trailer combination, wherein a tractor and trailer are engageable and disengageable at will, a tractor coupling pin, trailer jaws adapted to engage said tractor coupling pin and operatively couple said tractor and trailer, trailer brake, and means operatable by opening said trailer jaws to set said trailer brakes.

14. A tractor trailer combination as called for in claim 13, wherein said trailer jaws are opened by said tractor coupling pin during disengagement of said tractor from said trailer.

15. In a tractor trailer pin wherein a tractor and trailer are engageable and disengageable at will and the rear end of the tractor is adapted to be backed under the forward end of the trailer and coupled thereto, and wherein the trailer is provided with brakes:—means for operatively coupling the tractor and trailer, said means comprising a pin on the tractor, jaws on the trailer adapted to be actuated by the tractor pin to engage said pin and couple the tractor and trailer, said jaws being operatable by the tractor pin when the tractor is disengaged from the trailer, and means actuated by said jaws during disengagement of the tractor from the trailer to set the trailer brakes.

16. A tractor trailer combination as called for in claim 15, wherein said means includes a slidable member articulating said jaws and a brake setting member articulated with said slidable member.

17. In a tractor trailer combination wherein a tractor and trailer are engageable and disengageable at will and the rear end of the tractor is adapted to be backed under the forward end of the trailer and coupled thereto, and wherein the trailer has brakes:—means adapted for coupling the tractor and trailer, said means including a tractor pin, trailer jaws adapted to engage said tractor pin, and trailer brake controlling means adapted to be actuated by said jaws.

18. A tractor trailer combination as called for in claim 17, wherein the jaws are adapted to be opened and closed by said tractor pin during engagement and disengagement of said tractor and trailer.

19. A tractor trailer combination as called for in claim 18, wherein said trailer brake controlling means includes a slidable member between said jaws and articulated therewith.

20. In a tractor trailer combination wherein a tractor and trailer are engageable and disengageable at will and the rear end of the tractor is adapted to be backed under the forward end of the trailer and coupled thereto, and wherein the trailer is provided with brakes:—coupling means for said tractor and trailer, said means comprising a tractor pin, trailer jaws adapted to be opened by said tractor pin moving in an outwardly direction from said jaws, a slidable member articulating said jaws and adapted to be actuated thereby, means actuated by said slidable member adapted to control the trailer brakes, a release pin normally in said slidable member for holding it with said jaws closed about said tractor pin, and means adapted for operating said release pin to release said slidable member and permit said tractor pin to open said jaws and actuate said slidable member to set the trailer brakes.

In testimony whereof I affix my signature.

SIDNEY B. WINN.